US010387919B1

(12) United States Patent
Baluja et al.

(10) Patent No.: US 10,387,919 B1
(45) Date of Patent: Aug. 20, 2019

(54) ACCELERATED CONTENT DELIVERY IN BANDWIDTH-CONSTRAINED NETWORKS

(71) Applicant: Google LLC, Mountain View, CA (US)

(72) Inventors: Shumeet Baluja, Leesburg, VA (US); Maryam Garrett, Boston, MA (US); Cedric Beust, San Francisco, CA (US); Elad Gil, San Francisco, CA (US)

(73) Assignee: Google LLC, Mountain View, CA (US)

( * ) Notice: Subject to any disclaimer, the term of this patent is extended or adjusted under 35 U.S.C. 154(b) by 473 days.

(21) Appl. No.: 15/096,898

(22) Filed: Apr. 12, 2016

Related U.S. Application Data

(63) Continuation of application No. 11/480,304, filed on Jun. 30, 2006, now abandoned.

(51) Int. Cl.
*G06Q 30/00* (2012.01)
*G06Q 30/02* (2012.01)
*H04L 29/08* (2006.01)

(52) U.S. Cl.
CPC ..... *G06Q 30/0267* (2013.01); *G06Q 30/0256* (2013.01); *G06Q 30/0257* (2013.01); *H04L 67/10* (2013.01); *H04L 67/2842* (2013.01)

(58) Field of Classification Search
CPC ........... G06Q 30/0267; G06Q 30/0256; G06Q 30/0257; H04L 67/2842; H04L 67/10
See application file for complete search history.

(56) References Cited

U.S. PATENT DOCUMENTS

| 6,011,537 | A | | 1/2000 | Slotznick | |
|---|---|---|---|---|---|
| 6,078,953 | A | * | 6/2000 | Vaid | H04L 12/2856 370/235 |
| 6,141,010 | A | | 10/2000 | Hoyle | |
| 6,185,586 | B1 | | 2/2001 | Judson | |
| 6,292,465 | B1 | * | 9/2001 | Vaid | H04L 1/1854 370/230 |
| 6,317,761 | B1 | | 11/2001 | Landsman et al. | |

(Continued)

OTHER PUBLICATIONS

'Using Firefox 1.5 caching' [online]. Mozilla, 2006, [retrieved on Nov. 6, 2006]. Retrieved from the Internet: <URL: //developer.mozilla.org/en/docs/Using_Firefox_1.5_caching>, 5 pages.

*Primary Examiner* — Luis A Brown
(74) *Attorney, Agent, or Firm* — Fish & Richardson P.C.

(57) ABSTRACT

A communications device for providing content to a user is discussed. The device includes a communications interface configured to communicate with a remote server over a bandwidth-constrained wireless network having an inherent delay, a cache, a graphical display, and a content coordinator configured to obtain content. The content includes first content, and second content predicted by the remote server system as being directed to a category of a future information request. The content coordinator is also configured to store the received second content in the cache, receive a second information request, determine that the second information request is a request for content related to the specified category, identify some of the stored second content that corresponds to the specified category, and to display some of the identified stored second content during retrieval of responses to the second information request in less time than the inherent delay.

17 Claims, 7 Drawing Sheets

(56) References Cited

U.S. PATENT DOCUMENTS

| | | | |
|---|---|---|---|
| 6,687,737 B2 * | 2/2004 | Landsman | G06Q 30/02 709/203 |
| 6,769,019 B2 | 7/2004 | Ferguson | |
| 6,772,375 B1 * | 8/2004 | Banga | H04L 69/16 714/18 |
| 6,785,659 B1 * | 8/2004 | Landsman | G06Q 30/02 705/14.73 |
| 6,816,903 B1 * | 11/2004 | Rakoshitz | H04L 41/5003 370/230 |
| 6,826,614 B1 * | 11/2004 | Hanmann | G06F 16/9574 709/227 |
| 6,990,630 B2 | 1/2006 | Landsman et al. | |
| 7,054,917 B1 | 5/2006 | Kirsch et al. | |
| 7,076,443 B1 | 7/2006 | Emens et al. | |
| 2002/0013725 A1 | 1/2002 | Takakura et al. | |
| 2002/0016736 A1 * | 2/2002 | Cannon | G06Q 30/02 705/14.4 |
| 2002/0072353 A1 | 6/2002 | Kim | |
| 2002/0077900 A1 * | 6/2002 | Thompson | G06Q 30/02 705/14.68 |
| 2003/0023488 A1 * | 1/2003 | Landsman | G06Q 30/02 705/14.4 |
| 2003/0045273 A1 * | 3/2003 | Pyhalammi | H04L 12/14 455/412.1 |
| 2003/0163372 A1 | 8/2003 | Kolsy | |
| 2005/0004997 A1 * | 1/2005 | Balcisoy | H04N 21/23406 709/219 |
| 2005/0094562 A1 * | 5/2005 | Roy | H04N 5/222 370/235 |
| 2005/0096980 A1 | 5/2005 | Koningstein | |
| 2005/0202385 A1 | 9/2005 | Coward et al. | |
| 2005/0215238 A1 * | 9/2005 | Macaluso | G06Q 30/02 455/414.1 |
| 2005/0222987 A1 * | 10/2005 | Vadon | G06F 16/951 |
| 2005/0256941 A1 * | 11/2005 | Armstrong | G06Q 30/02 709/219 |
| 2005/0283468 A1 * | 12/2005 | Kamvar | G06F 16/3325 |
| 2006/0074753 A1 * | 4/2006 | Schuh | G06Q 30/02 705/14.23 |
| 2006/0100928 A1 * | 5/2006 | Walczak, Jr. | G06Q 30/02 705/14.64 |
| 2006/0111979 A1 * | 5/2006 | Chu | A63F 13/12 705/14.5 |
| 2006/0193608 A1 * | 8/2006 | Kim | G11B 27/034 386/336 |
| 2006/0242017 A1 * | 10/2006 | Libes | G06Q 10/10 705/14.54 |
| 2006/0242129 A1 * | 10/2006 | Libes | G06Q 10/10 |
| 2006/0248062 A1 * | 11/2006 | Libes | G06Q 10/10 |
| 2007/0061146 A1 | 3/2007 | Jararnillo | |
| 2007/0099636 A1 * | 5/2007 | Roth | G06Q 30/0247 455/466 |
| 2007/0112656 A1 | 5/2007 | Howe | |
| 2007/0184820 A1 * | 8/2007 | Marshall | G06Q 30/02 455/414.3 |
| 2007/0208737 A1 * | 9/2007 | Li | H04L 67/26 |
| 2007/0275695 A1 | 11/2007 | Arneson | |
| 2008/0215557 A1 * | 9/2008 | Ramer | G06Q 30/02 |
| 2009/0310509 A1 * | 12/2009 | Kumai | H04W 48/18 370/254 |

\* cited by examiner

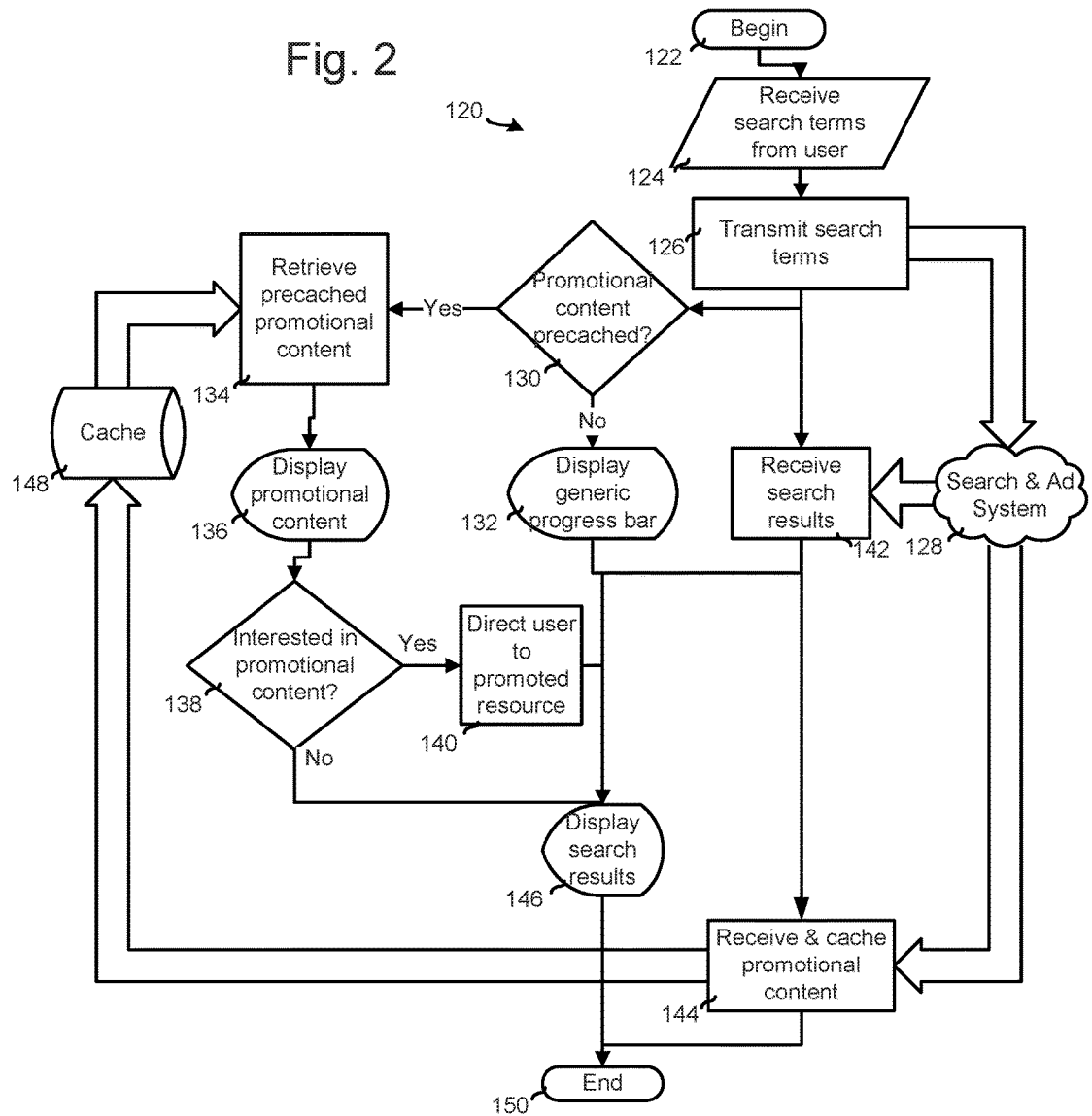

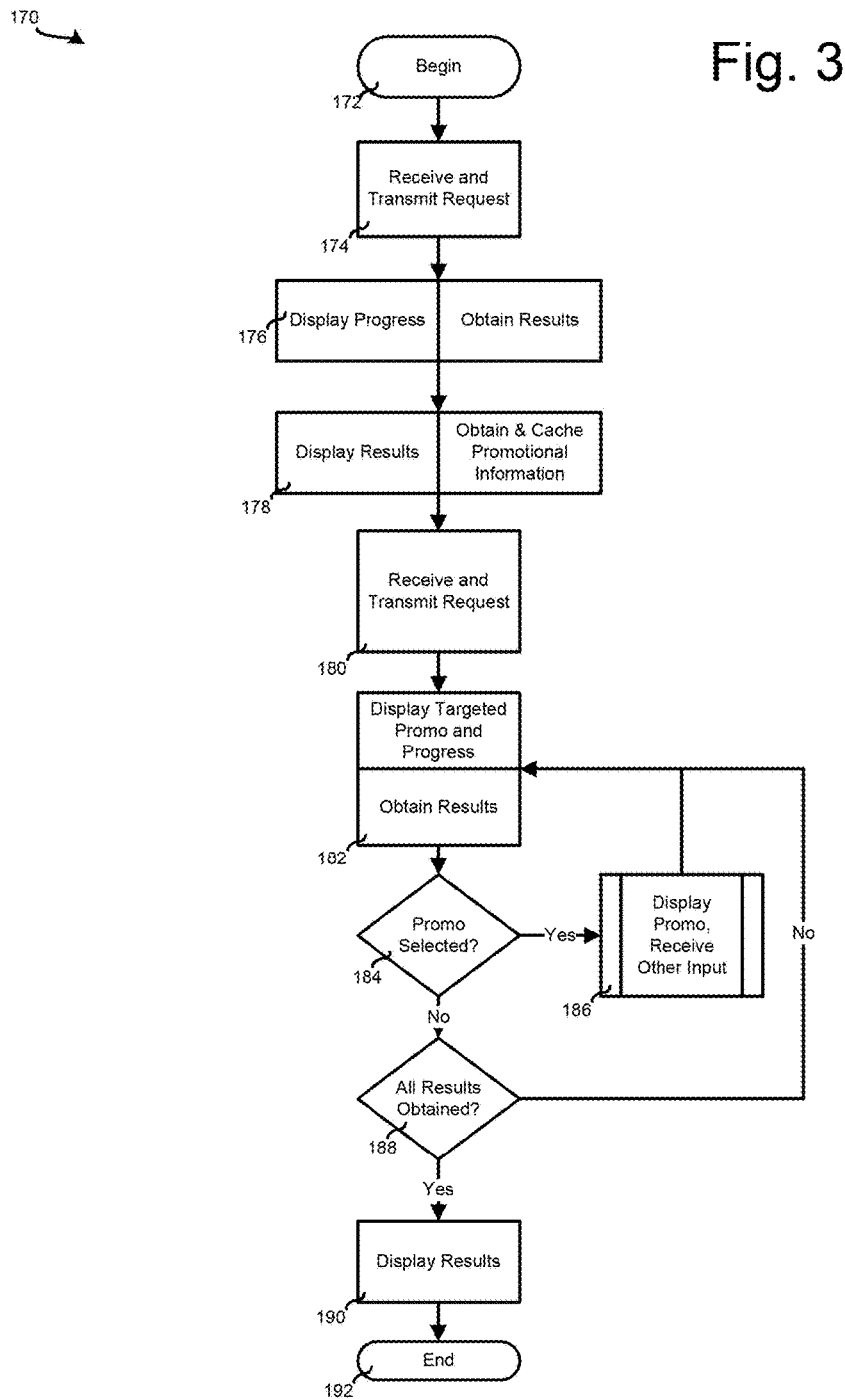

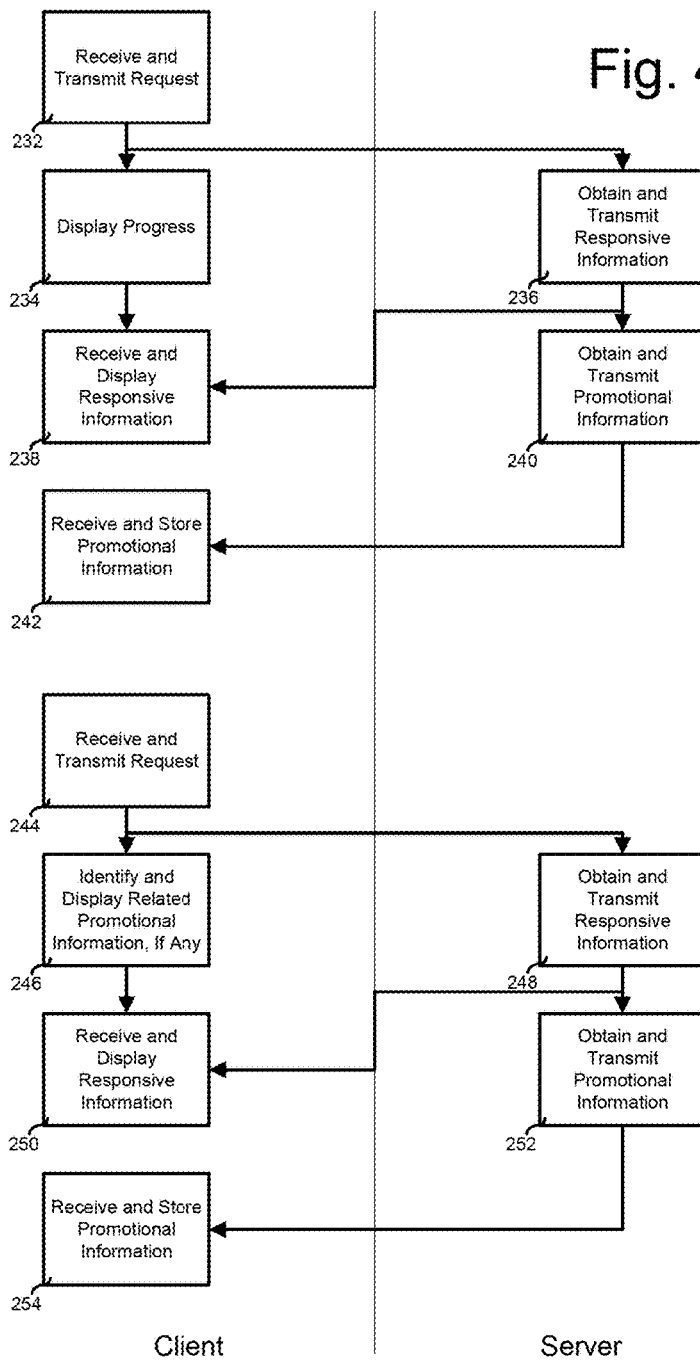

US 10,387,919 B1

ACCELERATED CONTENT DELIVERY IN BANDWIDTH-CONSTRAINED NETWORKS

TECHNICAL FIELD

This document describes the provision of promotional and other informational materials to users of bandwidth-constricted devices.

BACKGROUND

Retrieving material from the wireless or mobile web can be excruciatingly slow when compared to the wired web. The problem is worse when one considers that many people who have wireless web capabilities also have broadband connectivity at home or work. As a result, such people have become accustomed to very fast information downloads, so any delay on their mobile device (whether a PDA, cellular telephone, or other communicator) will seem even more extreme than it actually is. Some of this wireless delay is caused by connection latency, in that it can take seconds or more to establish an initial data connection on a wireless network. Other delay occurs because wireless networks, even when they have started sending or receiving data, are bandwidth constrained, so that information simply does not flow as fast as it would with a land line connection.

When users are forced to stare at a blank screen, any delay can seem like an eternity, in part because the user may not know at the time whether the delay is normal, or if there is instead something wrong with their connection so that they should give up or perhaps move to a better location with a better signal. This problem can be alleviated somewhat by providing the user with a progress indicator in the form of a graphic that informs the user that search results are being retrieved. In addition, the display may be animated, for example, to show a gauge that "fills up" as material is downloaded to the user's mobile device.

The user may also be provided with promotional material while waiting, much like certain software installation programs display promotions about related programs while a user waits for the software to install. Generally, however, such advertising is not helpful to the user because it is not targeted to the user. As a result, it can be more of an annoyance that an aid. Also, advertising that is unhelpful to the user is also unhelpful to the advertiser. Most advertisers seek to provide users with services or products that are actually helpful to them, and not to annoy the user. If the advertised product or service is not helpful to the user, the advertiser gains nothing because the user will not buy the good or service. Also, the provider of the advertisement, such as a syndicating organization, may get nothing if the user takes no interest in the advertisement (i.e., the user does not click on the ad).

SUMMARY

This document describes methods and apparatuses for providing users of bandwidth-constrained devices with information that is immediate and targeted to the users. The information is immediate because it is displayed to the user before other information sought by the user, which has an inherent delay, is retrieved for the user. The information is targeted because it is linked to actions and requests by the user, so that it more closely reflects likely interests of the user.

In one implementation, a method of providing promotional content to a mobile device is disclosed. The method comprises receiving a first information request from a user of the mobile device and receiving promotional material relating to the content of the information request at the mobile device, receiving a second information request from the user of the device after receiving the promotional material, and presenting all or some of the promotional material that corresponds to the content of the second information request. The first and second information requests may comprise search requests. The promotional material may include an advertisement containing a hyperlink that permits the user to obtain additional information about a product or service in the promotional material. Also, the promotional material may include an advertisement associated with a keyword that matches one or more terms in the first search request. The advertisement may also be associated with a keyword that matches one or more terms in the second search request.

In some implementations, the promotional material may be selected in response to the first information request by a server separate from the remote device, and all or some of the promotional material may be presented in response to the second information request by the mobile device. The promotional material may also be presented while the mobile device is retrieving information relating to the second information request from a remote server. In addition, the presentation of the promotional material may be replaced with all or some of the information relating to the second information request. Moreover, the promotional content may be ranked using the second information request, and the ranking may be based on the level of match between each piece of promotional content and a price offered for displaying each piece of promotional content. A third information request may also be received from the user of the mobile device and promotional material relating to the third information request may be presented while retrieving responses to the third information request.

In another example, a method of presenting promotional content to a user of a mobile device having download latency is presented. The method comprises providing to a mobile device one or more promotional items comprising promotional content relating to a subject, receiving an information request from the wireless device, and determining whether the information request corresponds to the subject, and if it does, presenting on the wireless device one or more of the promotional items while retrieving data responsive to the information request. The promotional content may be presented while the mobile device is retrieving information from a remote server, and the promotional items to be displayed may comprise a graphical item and a related non-graphical item. The graphical item may comprise, for example, a logo, and the non-graphical item may comprise, for example, text. The graphical item may also be pre-loaded in memory and displayed while the non-graphical item is being retrieved from a remote server.

In yet another example, a communication device is discussed. The device comprises a graphical display to present results of requests to a user of the device, means for pre-fetching and providing promotional content to the user, and a cache to store pre-fetched promotional content for later display to the user.

In another example, a communication device comprises a graphical display to present information to a user of the device, a content coordinator to obtain promotional content related to a first information request and display the promotional content during retrieval of responses to a second information request (wherein the displayed promotional content is related to the second informational request), and a cache to store the promotional content. The content coordinator may be configured to determine whether promotional content relates to the second information request, and the cache may store information for ranking promotional content.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a diagram of a process for obtaining and displaying promotional content.

FIG. 3 is a flow diagram showing a client device process for requesting, obtaining, and displaying promotional content.

FIG. 4 is a flow diagram describing the allocation of activity between a client and server in providing promotional information.

Like reference symbols in the various drawings indicate like elements.

DETAILED DESCRIPTION

Figure 1A:
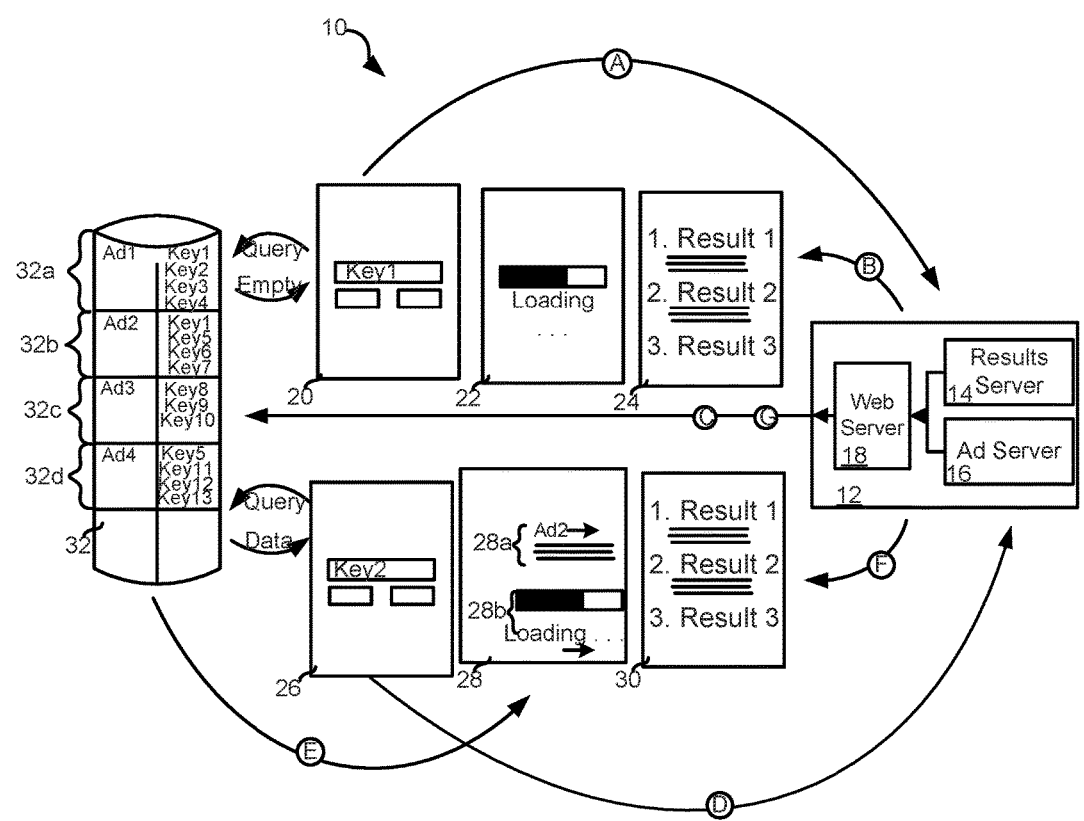
FIG. 1a shows the identification, transmission, and display of targeted promotional content to a client with limited bandwidth.

FIG. 1a shows the identification, transmission, and display of targeted promotional content to a client device 10 with limited bandwidth. In general, the device's bandwidth (including connection latency and/or steady-state transmission bandwidth) is too limited for the client to request, obtain, and display promotional content without imposing a noticeable delay on the system's ability to return search results or other content, and disrupting the user experience. To preserve a positive user experience, this implementation of the invention transmits and displays search results before promotional content is transmitted. Promotional content then may be transmitted in the background, though not immediately displayed. The device 10 then caches the promotional content for display at a later time. When a user executes a search or other request that is relevant to the cached content, that content may then be displayed while organic results for the request are generated and retrieved.

As shown in the figure, device 10 communicates with search system 12. Device 10 may include cellular telephones, personal digital assistants (PDAs), or other appropriate devices. Search system 12 may be part of a system such as that operated by Google. The particular form of the device 10 and search system 12 are not critical to the operation of the features discussed here. The connection between the device 10 and the search system 12 may occur by known means, such as wireless network, IEEE 802.11 (WiFi), IEEE 802.3 (Ethernet), IEEE 802.16 (WiMAX), fiber optics, satellite transmission, and other communication links or combinations of communication links. The particular form of the device 10 and search system 12 are not critical to the operation of the features discussed here.

In operation, the user is initially presented with screen 20, inviting the user to enter a search query. She enters her query and transmits it. The typical search query consists of one or more keywords that are used by the search and advertising systems to generate both search results and to identify targeted promotional content. Transmission A carries the query to search system 12, which will process it and return results. The query may be any appropriate form of request by the user. For example, it may be an explicit query entered by the user into a remote device, it may be a request generated by the device automatically in response to some earlier activity by the user or in response to another event, or it may be another sort of explicit or implicit request.

While the user awaits her search results, she is presented with screen 22. Because this is the user's first search, there is no stored promotional content available for display; therefore, screen 22 displays no promotional content. In this implementation, screen 22 displays a status bar to inform the user about the status of her search. Alternatively, certain generic content can be pre-loaded on the system, such as promotional material for the maker of the device or promotional material for common products or services (e.g., promotions for CNN or others that may want to provide promotional material regardless of the context and the requests by a user).

Meanwhile, search system 12 begins processing the user's request. Gateway system 18 (in the form, e.g., of a web server) receives Transmission A. In this implementation, gateway system 18 is capable of communicating with the user's mobile device and with the search provider's results and advertising servers. It also manages the flow of data among these three systems. Upon receiving Transmission A, gateway system 18 parses it and passes the relevant queries to results server 14, and advertising server 16. Each of these systems processes the query and returns results to gateway system 18. Gateway system 18 may include, for example, the components and functionality of an internet web server, as would be understood by a person of ordinary skill in the art. Also, each server just discussed may be a system of multiple servers (e.g., to provide higher throughput), or the functions may be combined in various manner on one or more servers.

Results server 14 may comprise a search engine capable of identifying documents relevant to the user's request from a universe of stored documents such as web pages, PDF files, Word documents, compressed (e.g., ZIP) files, e-mails, or other electronic documents. In this implementation, results server 14 identifies and scores relevant web pages and other documents based on the user's search terms. Results server 14 may also provide scores for documents independent of a search term, so that documents may be scored beforehand. A document's score may be, for example, a combination of the score determined before receiving the request, as adjusted for relevance to the request. Results server 14 then returns a ranked list of these documents, as well as each document's Uniform Resource Identifier (URI) (a URI is an Internet address such as "http://www.google.com/") to gateway server 18.

Results server 18 may take any appropriate configuration. For example, results server 18 may comprise multiple servers that separately handle portions of requests or particular requests, so that many requests may be handled by the system simultaneously. The particular arrangement of the results server 18 is not critical, however.

Advertising server 16 may comprise a database system capable of identifying promotional content relevant to the user's request from a universe of stored promotional content. Such content may be stored with the system, such as on advertising server 16, or may be stored elsewhere and referenced by advertising server 16. Also, content may be provided to advertising server 16 in any appropriate manner. As one example, the provision of content may be controlled, so that an administrator or administrators load and manage the content. As another example, the advertising server 16 may obtain content that is provided directly from advertisers. For instance, prospective advertisers may upload their advertising content to a web page, and may also specify a number of parameters about the provided advertising, such as key words associated with the advertising, and the amount the user is willing to pay for display of the content. The content may also be provided by a combination of such systems, or in other appropriate manners.

Advertising-related information may also be stored on the device 10. For example, prices for ads may be associated with each of the advertisements, so that advertisements are displayed as a function of the price (perhaps in addition to the key word used, and the applicability of the advertisement to the key word or key words), so as to form, in effect, a small auction on the device 10 of the type represented by the Google AdWords program.

In one implementation, advertising server 16 uses the Google AdWords system to identify a set of advertisements targeted to the user's interest. Each advertisement may be associated with one or more search terms. By comparing a user's search terms to the universe of stored advertisements and their associated search terms, advertising server 16 may identify and score the best advertisements for a particular search. It may then return a set of targeted advertising data to gateway server 18. The set may include a number of advertisements that advertising server 16 has identified as relevant to the search, as well as a list of all the keywords-including keywords that the user did not enter in this search-associated with those advertisements. As discussed in more detail below, the additional keywords may be used later in displaying the advertisements in response to subsequent requests by the user.

Gateway system 18 may then receive the results from results server 14 and advertising server 16. It may initially hold the advertising data and format the results to the request for transmission to the remote device, followed by transmitting the results to the device. Transmission B carries the search results to the user.

Upon receipt of transmission B, a screen 24 may be presented by the user's device to display the results received from the server. These results may be, for example, in the form of an ordered list of uniform resource locators (URLs), a relevant snippet from each result, and an address for each result. The user may then interact with the displayed results, such as by scrolling through them, or by selecting one or more results for further investigation. For example, the user may click on a URL and may then be presented with the content at the location represented by the URL. The user may, in appropriate circumstances, be returned to the screen 24 displaying the results. If a user interrupts the display of results or the downloading of information, such display or downloading may be resumed after the interruption is completed.

While the user is reviewing her results, gateway system 18 may prepare the promotional data for transmission to the user and may transmit it. Transmission C carries the targeted advertising data to the user. This transmission may occur in the background as the user is viewing results, and may occur by a separate thread from other transmissions.

In addition to including content that is directly responsive to the user's request, the transmitted promotional content may include other content to be provided to the user in the future. For example, topical promotional content may be delivered, such as content relating to current news events, or content relating to current entertainment happenings (such as promotions for the coming evening television line-up). This content may be assumed to be relevant to a user or likely to be responsive to future requests by the user because of its content. Also, topical content may differ by the time of day, such as promotions for fast-food breakfasts in the morning, and happy hour promotions in the afternoon.

The promotional material may also be identified through predictive techniques. For example, where a user enters a particular request, and observation of multiple other users who made the same request indicate that they made follow-up requests of a particular type or topic, the system may obtain promotional content relating to the follow-up requests in addition to, or in the place of, promotional material relating to the initial request. As one example, users who enter "Italian Food" may frequently enter "Italian Restaurants," "Wine Stores," or "Chinese Food" as follow-up requests. Similar correlation may be found or assumed when the subsequent requests are entered first (e.g., searchers for Chinese restaurants might then search for Italian restaurants). Thus, when a user searches on "Italian Restaurants," the system may begin transmitting promotional material, not merely responsive to the request, but also response to the "Wine Stores" and "Chinese Food" requests. In this manner, the remote device will be pre-loaded with promotional material directed at Italian food and Chinese restaurants.

In addition, some of the content may be displayed to the user while the user is reviewing the initial results, or may be displayed if the user requests additional information relating to the first request. For example, in an initial download, a system may transmit the ten best results to a remote device. While the user reviews those results, the system may transmit content relevant to the request, and if the user chooses to display a next group of ten results, the remote device may display the promotional content.

The content delivered to the remote device, whether as results or promotional content, may also be directed to the locality of the user, such as is provided by the Google Local system or a similar system. Specifically, a user's device may transmit, along with a request, information (such as in a message header) indicative of the location of the device (e.g., generated by GPS circuitry). Where the request relates to food, for example, results for restaurants and grocery stores near the user may be returned, as may be advertisements for restaurants in the area.

When transmission C reaches the user's device, it is no longer suitable for immediate display—by this point, the user is probably engaged in other activity, and displaying the promotional content would disrupt her experience. Rather than displaying the set of promotional content, the user's device stores the set in cache 32. Certain promotional material could also be displayed, however. For example, material that does not interfere with a user's review of the results could be displayed, such as in the form of scrolling text near the edge of screen 28 or as a float-over graphic that passes over the remainder of the display.

Once the promotional content has been entered into cache 32, the cache 32 will contain a number of advertisements (32a, 32b, etc.). One or more keywords may be associated with each advertisement, and the keywords may also be cached, such as with a pointer to the corresponding content. Identifiers for the advertising other than keywords may also be used. For example, certain set categories may be established (e.g., entertainment, transportation, home, etc.) and each advertisement may be assigned to one or more of those categories. The suitability of the advertisement for later display when a user enters a subsequent request may then be judged in part or in whole on whether it falls within a category that is also associated with the request. For example, where there is a keyword match, promotional content having a matched keyword may be displayed, but where there is no match, the categories may be used as a back-up measure for determining whether there is a match. In such a situation, a system may ensure that a remote device is pre-loaded with at least one instance of promotional material for each category so as to ensure that some advertisement will be displayed regardless of the content of any subsequent request.

Other parameters associated with the advertisements may also be stored on the mobile device. For example, an amount that an advertiser is willing to pay for display of an advertisement may be stored, as may an indication of the relevancy of the advertisement to particular key words. The indication of relevancy may be determined, for example, as a function of the frequency with which other users who have entered the same or similar request have selected the advertisement when it has been presented to them. The ranking of the advertisement (i.e., whether it is displayed at all or is displayed before other advertisements when multiple advertisements are displayed) may be a function both of the amount the advertisers is willing to pay and the relevancy of the advertisement. In effect, the client may carry out a mini-auction among available advertisements.

In addition, the mobile device may record activity relating to advertisements. For example, the device may track the number of times an advertisement is displayed (i.e., so-called "impressions") and the number of times an advertisement is clicked through. Click-throughs may also be separately monitored at a server. Such information, when stored on the mobile device, may periodically be transmitted back to a central system. As such, the information may be used to determine amounts to charge advertisers, and also to judge the performance of advertisements so as to improve the advertisements that are presented to users. For example, advertisements that are not clicked through, may have their ranking reduced so that they are not displayed as prominently (or not transmitted to mobile devices at all).

For purposes relevant to this description, the system will wait for the user's response while displaying the results and storing the transmitted promotional material. When the user selects, for example, to enter a new request, the user may be presented with screen 26, inviting a subsequent request. The user enters her subsequent request and transmits it. Transmission D carries the subsequent request (e.g., in an electronic, translated format) to system 12.

After the user has entered her subsequent request, it is compared by the remote device to the keyword terms or other content identifiers stored in cache 32. If there is a match—that is, if one or more terms in the user's subsequent request matches one or more of the stored keywords—then an appropriate advertisement is selected and sent to the screen as display stream E. The user may then be presented with composite screen 28. Screen element 28a displays the selected advertisement or other piece of promotional material, while screen element 28b displays other content. In this implementation, screen element 28b displays a status bar. Other arrangements of items for display may also be used.

Also, content for display may be provided at various levels of detail. For example, the logo of an automotive company may be stored and associated with appropriate keywords. In addition, multiple specific promotional materials for the company may also be stored, such as specific tag lines. As one example, a company may have certain "teaser" text to draw interest in its truck line (e.g., "for tough customers . . . ") and other text for its hybrid vehicles (e.g., "best mileage in its class . . . "). The remote device may generate promotional displays by combining the logo with the appropriate tagline, as selected to match a subsequent request by the user. The logo, which requires relatively more bandwidth to transmit and memory to store, may thus be transmitted and stored only once, while the tag lines, which may be simple text, can be many in number but relatively small to transmit and store. In this manner, "rich" advertisements may be displayed, but many versions of the advertisements may be available without excessive overhead.

While the content is being identified and displayed, search system 12 processes the user's subsequent request. As described above, gateway system 18 may receive transmission D, parse it, and pass it to results server 14, and advertising server 16. Each of these systems may process the request or a modified version of the request, and return results to gateway system 18. Results server 14 may return a list of search results; advertising server 16 may return a set of promotional content targeted to the user's subsequent request. As before, gateway system 18 may hold the promotional content in abeyance and sends the user's results as transmission F. These results may then be displayed as screen 30—replacing screen 28.

While the user is reviewing screen 30, gateway system 18 may send the promotional content as transmission G. As before, this content is entered into cache 32 for later use. If the cache is full, the new content may push out old content in a FIFO fashion, or in a least commonly used fashion. The remote device may also determine what promotional content is overlapping and remove portions of that content first. In a predictive system, the device may also determine what content is least likely to be responsive to a third request, and may use either of the prior requests, a combination of the requests, or other ambient data (such as current event and other current data discussed above).

The search system 12 may also store a variety of information related to the content delivered to, and viewed on, remote devices. For example, search system 12 may contain a database identifying the promotional content (e.g., advertisements) currently stored on each mobile device, and also advertisements previously delivered to or stored on the devices. This information may be used in managing the promotional content, such as in determining when updated advertisements need to be transmitted to a particular mobile device (e.g., when advertisements or portions of advertisements such as particular text are new or are changed). Thus, for example, an advertiser's logo may initially be transmitted to a device, along with current textual promotional content. If the textual promotional content becomes dated (e.g., a promotion or sale ends, or a model is updated), the textual promotional content may be replaced on search system 12, and may then be pushed out to the mobile devices.

For a user, this implementation may provide a number of advantages. For example, a user may be presented with less obtrusive promotional content than if the content is displayed over or on the results. The promotional material may be particularly unobtrusive because it may be shown at a time and in an area that is typically blank for the user, and during which the user may otherwise become bored. Advertisers also advertise because their content is useful to users, so users may benefit by receiving promotional content that is more useful to them. For example, if a user is already planning to go to an Italian restaurant, they will be greatly aided if they are shown material giving them a discount at such a restaurant while they are searching.

The implementation may also provide advantages for promotional content providers. For example, their content may be given more prominence during a time in which the screen is otherwise blank. Also, the response rate to their promotional material can be expected to be greater when the material is targeted to the needs of the user. In addition, advertisers may save money by more narrowly focusing their ads on users who are most likely to respond favorably to them. In addition, advertisers can avoid generating unnecessary ill will by not providing promotional content to those who do not want to see it.

Figure 1B:
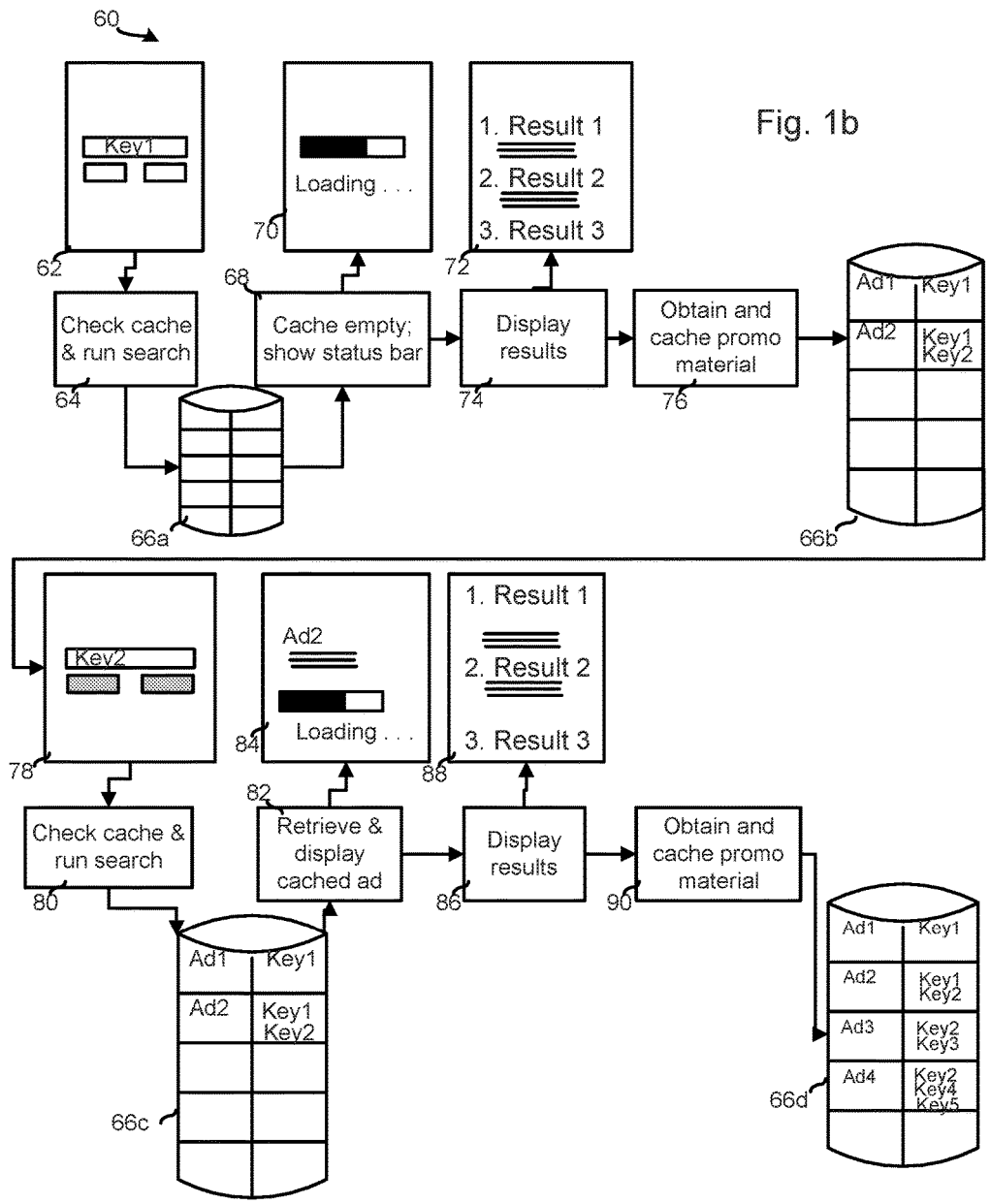
FIG. 1b shows client device processes for requesting, obtaining, and displaying targeted promotional content.

FIG. 1b shows client device processes 60 for requesting, obtaining, and displaying targeted promotional content. In general, a user enters a first request, and promotional material is downloaded in response to that request. The promotional material is stored for later display, such as when the user makes subsequent requests.

The user is first presented with screen 62, inviting her to enter a request. In this illustration, the user enters a single search term ("Key1") and instructs the system to run the search. The search term may include a single word or a group of words in the form of a phrase or sentence, or other identifiable data. The search term may also include control characters that provide further indications of the information the user is requesting. For instance, certain pieces of punctuation may indicate that the user wants to perform certain functions, such as by adding a colon after a term to indicate that it is a controlling term, and the following terms are search terms. For instance, a user may enter "definition:" to indicate they would like to receive a dictionary result, and following with "circumscribe" to indicate that it is the word for which they would like a definition. Other terms such as "and" and "or" may be used, for example, to construct a Boolean-style request. Various other well-known manners of accepting requests may also be employed, as would be understood by a skilled artisan.

Process 64 includes two items performed at nearly the same time. In one, the client device transmits the user's request to another system for processing, and checks cache 66a to determine if there are any pre-cached advertisements associated with the user's search terms. For purposes of illustration, cache 66 is diagrammed four times—66a, 66b, 66c, 66d. Each diagram represents the cache at a different time in the practice of the implementation.

In this illustration, cache 66a is shown as empty, indicating that there is no pre-cached advertising content. For example, perhaps no requests have been made by the user during the current session so that no information has been pre-fetched. Process 68 describes that, because the cache is empty, the device will present the user with a generic screen, screen 70, while she waits for her search results. In this illustration, screen 70 contains no advertising and contains a status bar to give the user a sense of her search's progression. Another implementation of this invention might be to show non-targeted advertising on screen 70 instead of simply a status bar. Also, weakly-targeted advertisements could also be displayed, i.e., advertisements related with a general category (e.g., transportation, home, etc.) that corresponds to a general category to which the request also corresponds. In such a situation, a weakly-targeted advertisement may be provided to the user while a first request is being handled for a session, while more strongly-targeted advertisements may be provided for subsequent requests.

When the search results have been fully obtained, process 74 describes that they will be displayed to the user. Screen 72 shows one example of how they might be displayed. Because the user does not have to wait for promotional content to be obtained before her results are displayed, the user experience will be enhanced. Appropriate promotional content could also be displayed with the content on screen 72, either at the same time the results are displayed, or later when the promotional content is received, such as by providing a float-over advertisement.

While the user is reviewing the search results listed on screen 72, promotional material associated with her search is obtained and cached as part of process 76. Cache 66b illustrates how the promotional material might be stored for later use: in this illustration, it is stored in the cache as a table comprising several ads and associated keywords. Alternative implementations are possible—for example, each ad might have more than one keyword associated with it, or the cache might contain a synonym dictionary indicating rough equivalence among certain keywords that the user might enter. Also, multiple ads may all rely on a common element, such as a logo. Such common elements may be stored separately from the other information, and each advertisement may contain a pointer to the appropriate logo. As such, multiple advertisements may be stored in a relatively small amount of memory, enabling the system to provide even more relevant promotional materials to users.

A synonym dictionary, or information for inclusion in a synonym dictionary, may also be retrieved. Such information may be used by the user's device later when follow-up requests (i.e., later requests that may relate or not relate to the initial request) are provided, so as to look for matching promotional or advertising material that is a match to the later requests but that uses synonymous descriptors, such as key words.

Once the promotional information has been cached, the system is ready to receive another request. If a request is received before caching is complete, the caching may be interrupted and perhaps completed after the request is served. If the user wishes to make another request, the user may make an appropriate selection and the user may be presented with screen 78, inviting a new request. Alternatively, a blank request box may be shown above the results from the first request so that the user may immediately enter a new or modified request (e.g., the original request may be filled-in in the request box). In this illustration, the user enters a two-term search query, "Key2," and initiates the search. The subsequent request may take other forms also, such as a selection by the user to receive additional results from the initial request.

Where the user makes a follow-up request, and as above, in process 80, the search is initiated and the cache checked for relevant promotional content. In this illustration, cache 66c contains ads associated with the terms "Key1" and "Key 2," so that advertisement could be identified as relevant to the follow-up request because of the commonality of the term Key 2. The correspondence between particular advertisements and the follow-up request may also be determined in any other appropriate manner, such as by correlating the request with categories, and then looking for advertisements in those categories or similar categories.

In process 82, one of the ads is selected and retrieved. Any number of mechanisms might be used for selecting which ad; the system may, for example, look for ads that have not been displayed before, or that have been pre-selected for rapid display, or apply other appropriate logic and rules. In one example, the first-listed advertisement having a keyword corresponding to one of the follow-up request keywords could be displayed, and multiple advertisements may be displayed simultaneously (e.g., split-screen) or sequentially while the request is being filled. For example, where the wait for results is very long (such as on an older or otherwise slower network), the mobile device may cycle through several advertisements. Such selection may occur at the beginning, such as by selecting a number of advertisements, or may occur after a first (or subsequent) advertisement has been displayed for a predetermined time period, or after a user indicates (such as by pressing an appropriate button) that they are not interested in the advertisement and would like to move onto the next advertisement while they wait for their results. For this illustration, it is sufficient to state that an ad is selected and displayed to the user on screen 84.

In this illustration, screen 84 includes both the selected ad and a status bar so that the user knows the status of her search. The illustration shows a text-based ad, but ads in other media—graphical, auditory, multimedia, etc.—are also possible. Also, various mechanisms may be provided by which the user may decide to act on the advertisement. For example, a hyperlink of clickable images may be provided. Also, the link or image may be tagged such that a user could easily use a constrained keyboard such as a telephone keypad to select the advertisement. For example, a typical advertisement could be accompanied by a number indicator from 0-9 to indicate a telephone key that would take the user to a location to discuss the advertised material, such as the web site of an organization associated with the advertisement.

If the user selects the advertisement while the results are being retrieved, the retrieval of the results may be interrupted and the user may be shown information relating to the advertisement. For example, the user's device may be redirected to a web site associated with the advertising organization. Any unfinished retrieval may then be completed later, such as when the advertiser's web site has been retrieved and the user is reviewing it, or when the user navigates back to the results screen.

An advertisement may also maintain its display even after the results are retrieved. For example, a minimal time for display of the advertisement may be specified so that a quick retrieval of the results or an error in downloading does not result in flashing of the advertisement on and then off. Also, the display of the advertisement may be maintained after the response is retrieved until the user makes a selection to remove the advertisement and replace it with the results.

The remaining steps in FIG. 1*b* resemble those taken during the user's first search. In process 86, when all the results have been obtained, they are displayed to the user on screen 88, and the user may review and interact with the results.

While the user reviews her results, in process 90, promotional content associated with her follow-up request is obtained and cached. Cache 66*d* shows one method for storing promotional content. In this illustration, the new promotional information is simply added to the cache alongside preexisting information, but other implementations are possible. In some implementations, space constraints will require that certain promotional information is selected for deletion and deleted in order to make room for new promotional data. Also, new promotional information need not be limited to the keywords used by the user.

As one example of a search and three follow-up searches with the disclosed process, a user may initially query "Chinese Restaurant." If it is the first use of the system or the first use in a particular session, no targeted advertisements would yet be stored locally, so the user's device would display no advertisements, generic advertisements, or weakly-targeted advertisements. The device may in addition show a progress meter. During that time, results may be transmitted to the user's device, and may be displayed when they are obtained. As the user is reading the results, promotional materials may be downloaded in the background, including materials related to Chinese Restaurants, other types of restaurants, dessert specialists, and/or antacid providers. Other types of information may be determined in other appropriate manners such as by using clusters of information arranged so as to provide relationship indicators between and among the pieces of information, or by other tools or techniques. Where the advertisements are small (e.g., when logos have already been retrieved and only textual components need to be retrieved), the advertisements may also be transmitted with the results. The advertisements may be stored but not shown at this time.

In a second request, the user may enter "ipod downloads." The advertisements cached in response to the "Chinese Restaurants" do not match this follow-up request in any way, so no advertisement or a weakly-targeted advertisement may be shown while results are retrieved. While the results are displayed and the user is reviewing them, content related to "ipod downloads" may be loaded into the cache. The advertisements are again not displayed, but can take any appropriate format, and may be determined based on techniques such as phil clusters. Again, a synonym dictionary may be updated (e.g., with terms like "MP3 player," "podcasts," etc.).

Alternatively, if an Apple Corporation logo has already been stored on the device, the "ipod" entry may trigger an association with Apple, and the Apple logo may be displayed. If a user selects the logo, they may be redirected to the Apple web site. They may also be directed to a web site, with "ipod downloads" transmitted as an argument by the user's device, so that the web site can display appropriate information. Alternatively, clicking on the logo may cause a restricted search to be completed, such as a search restricted to the www.apple.com site using the request "ipod downloads." The user may be immediately delivered to the most appropriate part of the site by structuring the request as an "I'm Feeling Lucky" or similar request. In this manner, although the advertisement is weakly-targeted, the user may nonetheless be directed to a targeted location upon selecting the logo, all before any targeted content is transmitted to the user's device.

Instead of selecting the advertisement, or upon returning from viewing information to which the advertisement points, the user may enter a third request such as "dim sum restaurants." The synonym dictionary or the advertisements transmitted with the first response may indicate that "dim sum" is a related word. As a result, related strongly-targeted advertisements may be displayed immediately, while responses to the request are being retrieved (and certain responses may be displayed quickly if predictive querying has been used). A progress meter may also be shown next to or on top of the advertisement or advertisements. The results may then be shown (e.g., when the user clicks on a button to overwrite the advertisement), and additional advertisements may be retrieved in the background.

In a fourth request, the user may enter "ipod colors." This request is almost identical to the second request. In such a situation, pre-loaded advertisements corresponding to the second request may be displayed immediately while the response is being transmitted, and a progress meter shown. Also, where graphics such as logos are stored separately from other content such as text, the graphic may be displayed immediately, and text for the advertisement may be retrieved and displayed before the results are obtained. The verbiage may be added as soon as it is obtained, and may be displayed, for example, as a "fade in" so as to give the impression that the advertisement is animated and intentionally being built piece-wise rather than only according to the arrival of the textual content. Again, when the results have been retrieved, they may replace the display of the advertisement. A minimum advertisement display time may also be specified. As the results are being reviewed by the user, yet more advertisements may be retrieved in the background, and the process may continue.

In addition to the processes discussed above, the user may interact with advertisements in any appropriate manner. For example, a "speed-dial" key such as "#" may be identified in the advertisement or may be a standard key that, when pressed, dials the advertiser or a representative of the advertiser, just as pressing a different "hot" key (e.g., "*") could take the user to the advertiser's web site. In addition, when the user receives results in a tabbed format (e.g., with web, blogs, news, images, etc. each under different tabs), the advertisements may be displayed under an "ads" tab, which when clicked will show the relevant advertisements. Where the device is multi-threaded, the search application may continue in the background while the advertiser is contacted in the foreground. Where the device is not multi-threaded, but allows for an application to remain in a "paused" state, the search application may remain in the paused state until the user returns.

FIG. 2 is a diagram of a process for obtaining and displaying promotional content. This drawing reflects certain elements of the client device's behavior when implementing one implementation of the invention. In particular, it shows how the client device uses a pre-caching system for displaying promotional content. Rather than make the user wait while the client retrieves promotional content, the client retrieves promotional content after the user has completed his search, and caches it for quick display the next time the user enters a similar search.

The process begins with data entry 122, in which the client receives a search query or other request from the end user. This query may be provided to the client in any number of ways, including keypad entry, transmission from a remote device, or spoken query. Typically, the query will comprise one or more search terms that the search system will use as reference points to develop its results.

Processes 124, 126 describe the client's transmission of the search terms to the search & ad system 128. In this implementation, the client does not have a local capacity for developing a search result list; it must transmit the terms to another system for processing. The client's transmission to the search & ad system may take any number of forms, including radio, wire, optical, or combinations thereof.

Once the client's transmission to search & ad system 128 is complete, the client must wait for search results to be returned to it. While it waits, the client will display promotional content targeted to the user's search query, if any such content has been pre-cached. If not, the client may display a generic progress bar or generic or weakly-targeted advertising, and will await receipt of the search results. Decision 130 describes the client's logic. The client will check to determine if any promotional material has been pre-cached that is suitable for display in response to this query. In this implementation, if there is no pre-cached promotional content, or there is pre-cached promotional content, but that content is not relevant to the user's search query, the client will answer decision 130 in the negative and will provide the user with display 132—a generic "Loading . . . " screen, with a progress bar and no promotional content.

If there is pre-cached promotional content relevant to the user's search query, the client will answer decision 130 in the positive and will move to process 134. In process 134, the client will retrieve the relevant promotional content from cache 148 and present the user with display 136—targeted promotional content relevant to the user's search query.

At this point, the user has a choice (represented by decision 138). He may express his interest in the promotion (by any number of means, including keypad entry, mouse click, spoken signal, etc.), or he may simply wait for his search results to be provided. If he does express interest, the client will move to process 140 and will direct him to the resource associated with the promotion. If the user does not express interest in the promotion, the client will simply await receipt of the search results (process 142).

Once the user has been directed to the promoted resource (process 140), in this implementation the client device will continue to await and receive search results (process 142). For purposes of illustration, it may be assumed that the client's interest in the promotion has not diminished his interest in his search results, and that he will review them when they become available. In other implementations, if the user has moved on to other resources, the client might carry out the remainder of this implementation in the background.

While the client is going through the sub-process described above, search & ad system 128 may process the user's search query. When processing is complete, search & ad system 128 will have two sets of content ready for transmission to the client: (1) a set of search results, and (2) a set of promotional content targeted to the user's search query. Search and ad system 128 will transmit the search results first. As above, this transmission may be electrical, radio, optical, or any combination thereof.

When the client has received all the search results (process 142), it will immediately display them (display 146), and the user may begin reviewing them. In some situations, the search results may be broken up into multiple transmissions (e.g., with ten results per transmission). With respect to obtaining additional promotional material, each request for more material may be treated as a distinct request, so that promotional content is obtained while the viewer is reviewing the first ten results, and may be displayed after the user chooses to see the next ten results (assuming there was time to retrieve the content while the user was viewing the first ten results).

While the user is reviewing his search results, search and ad system 128 will transmit the targeted promotional content to the client device. When the client has received the promotional content (process 144), it stores it in cache 148 for future retrieval. At that point, execution of this implementation will be relevantly complete, and the system will reset and await new search terms from the user.

FIG. 3 is a flow diagram showing a client device process 170 for requesting, obtaining, and displaying promotional content. It describes the client's behavior through two searches; the diagram describes one search immediately following the other, but in practice the two searches need not be consecutive.

Process 174 describes the user entering his search terms and the client's transmission to the search/ad system. Once the request has been transmitted, process 176 describes how the client obtains search results while displaying a simple progress bar. In this implementation, results retrieval occurs in the background while the user sees the progress bar. No promotional content is displayed at this stage of the illustrated process because the client has not yet received any promotional data and so has nothing to display while the user awaits his results.

Once the search results have been fully obtained, process 178 describes how the client displays the results to the user while, in the background, it obtains and caches promotional information relevant to the user's search query. Because the promotional information is obtained while the user is reviewing his search results, the user experience is not disrupted by the transmission. The promotional content is now available for the client's use the next time the user enters a related search query.

Process 180 describes a new search request. As in process 174, the user provides a search query and the client transmits it for processing. For purposes of this illustration, assume that the search query in process 180 is related to the query in process 174. For example, the search terms in process 174 might have been "American car," while the terms in process 180 are "American SUV." As soon as the client receives the terms from the user, it transmits them for processing.

Because this search is similar to the search described above, the promotional content that was obtained and cached in process 178 will be relevant to the user's query here. In process 182, the client retrieves the appropriate promotional content from the cache and displays it to the user while it obtains the user's search results.

At this point, the user has an option-if he finds the promotional content interesting, he may select it and receive further information about it. If not, he can simply wait for his search results to arrive. This choice is represented by decision 184. If the user "selects" the promotional content-using a keypad, mouse click, spoken command, or other input mechanism-then in sub-process 186, the client device will display additional information related to the promotion and, in some cases, solicit additional input from the user. For example, the user might provide his email address, mailing address, or mobile phone number in order to learn more about the promotion, or he might obtain the location of a resource such as an Internet web page where he can learn more. In this implementation, once the user has obtained the promotional information he seeks, the client will resume its task of obtaining search results. However, other implementations are possible, such as where the client program simply obtains the results and promotional information in the background while the user "surfs" away through different online resources.

If the user does not signal his interest in the promotional material presented to him, at decision 188 the client checks to make sure that all the search results have been obtained. If they have, then in process 190 the results are displayed while the client obtains fresh promotional content in the background. If not, the system waits until they have, possibly showing additional promotional content (assuming that more than one piece of relevant promotional content exists in the cache). Once the results have been displayed and promotional content downloaded, the system will reset and await a new query, effectively ending this illustration (termination 192).

FIG. 4 is a flow diagram describing the allocation of activity between a client and server in providing promotional information. Client-side activities are represented on the left hand side of the illustration; server-side activities are on the right.

In element 232, the client receives a search request from the user and transmits it to the server. Upon receiving the search request, the server begins processing it, developing a set of responsive information-typically, search results. Element 236 describes this process. When processing is complete, the server will transmit the search results to the client.

While the server is busy processing the search request, in element 234 the client will display a simple progress meter or other non-targeted content. Because no promotional information has yet been cached, the client has no related promotional information to show the user, so a simple progress meter is used instead.

When the server completes processing the search query and generates responsive information, it will transmit it to the client (element 236). In element 238, the client receives and displays the search result for the user to review.

While the user is reviewing her search results, in element 240 the server further processes the search request and generates a set of targeted promotional content, which it then transmits to the client. The client receives and stores the promotional content in element 242. In most implementations, this step will occur in the background, either while the user is still reviewing her search results or after the user has moved on to other activities. At this point, and for purposes of this illustration, the system is ready to handle another search query.

In element 244, the user enters a request and the client transmits it to the server for processing. In element 248, the server receives the request and begins processing it. When complete, it will transmit the result to the client. While the client waits for the server's response, in element 246, it reviews the cached promotional content to identify related promotional information. If any appropriate information can be found, the client will display it to the user until it receives search results from the server. Meanwhile, the server will continue processing the user's search request (element 248); when complete, it will transmit the responsive information (in this implementation, a set of search results) to the client.

In element 250, the client receives the responsive information from the server and displays it to the end user. While the user is reviewing her search results, in element 252 the server further processes the search request and generates a set of targeted promotional content, which it then transmits to the client. The client receives and stores the promotional content in element 254. As discussed above, this step may generally occur in the background. At this point, and for purposes of this illustration, the system is ready to handle another search query.

Figure 5:
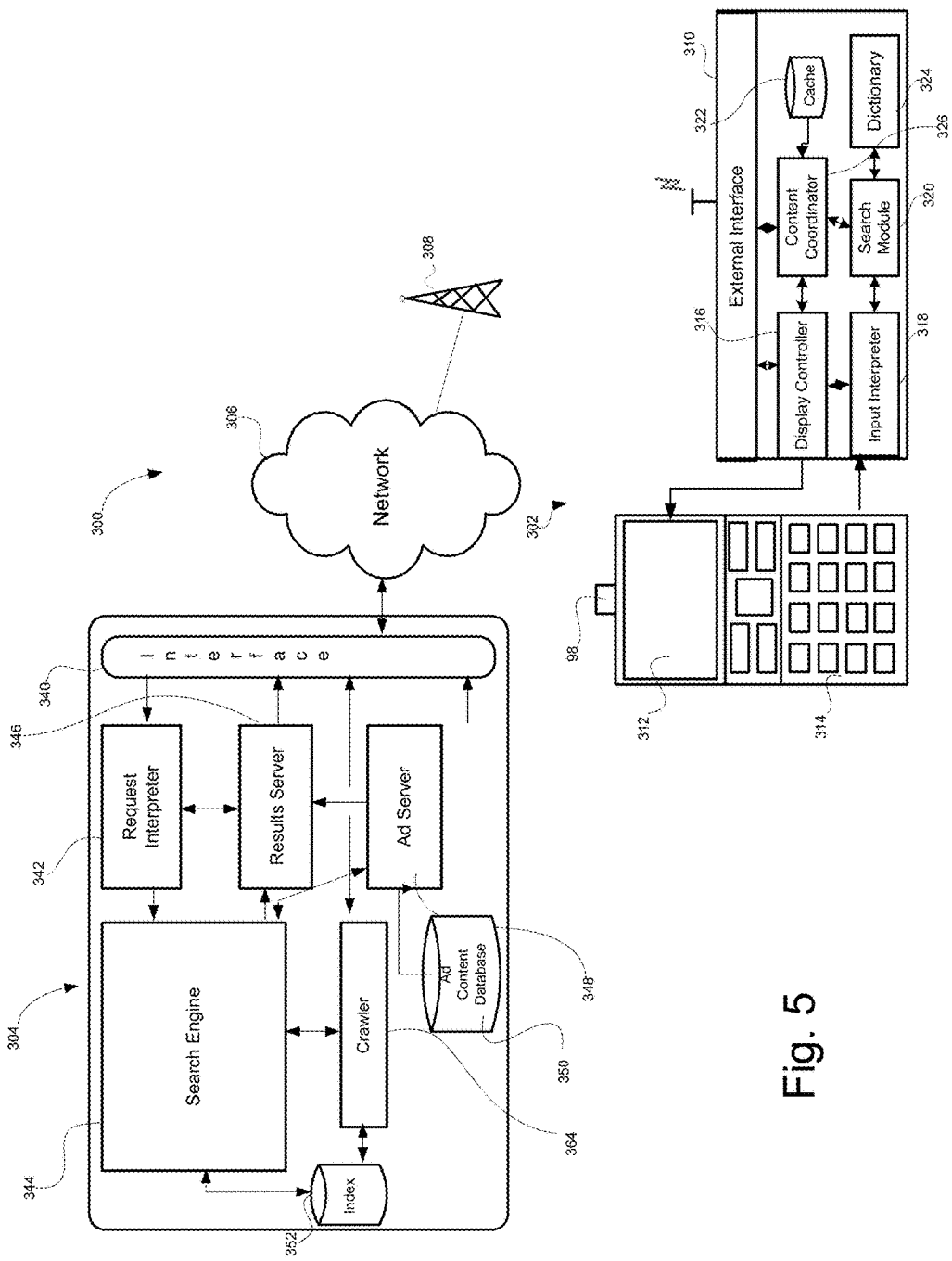
FIG. 5 is a diagram of an exemplary system for providing promotional content to a remote device.

FIG. 5 is a diagram of a system 300 for providing promotional content to a remote device. The system generally includes a central system 304, such as a server or group of servers, a remote device 302, such as a wireless communication device, and a network 306 to connect them. Network 306 may comprise, for example, any appropriate combination of a LAN, a WAN, the Internet, a wired or wireless communication network, the telephone network, or other appropriate networks or communication links, and associated apparatuses.

The central system 304 may include, for example, components to provide search results or other responses to requests, including lists of information responsive to requests, along with hyperlinks for items in the lists, and also advertising content for display on the remote device 302. Central system 304 may communicate with network 306 through interface 340, which may include, for example, one or more web servers or other appropriate components for receiving information from, and transmitting information to, network 306. Interface 340 may also parse, join, or otherwise format data coming into or going out of central system 304.

Requests received by central system 304 may be provided to a request interpreter 342, which may be a structure or structures configured to analyze a request, such as to determine which application of several applications should process the request, or in order to determine how to route the request. For search requests, request interpreter 342 may forward the request, in its original form or in a modified form, to search engine 344. Search engine 344 may comprise any number of appropriate components or modules needed to generate appropriate responses to requests for information, such as information on the internet.

Search engine 344 may be aided in obtaining information by crawler 364, which may be configured to constantly scan a network such as the internet for information, and may parse and index the information, such as in index 352. The information may be indexed in such a manner that responses to requests form users may be generated quickly and with high accuracy. The particular operation of the search engine 344 is not critical here, however, and may take any appropriate form.

Responses to user requests may be generated by results server 346 which receives information from search engine 344, and may format the information for user by remote device 302, such as by generating a search result list of URLs and snippets for web pages responsive to a request by a user. In a similar manner, ad server 348 may prepare relevant promotional material, such as targeted advertisements, to a use's remote device 302. Ad server may obtain promotional content, for example, from ad content database 350 or from other appropriate locations.

Ad server 348 and results server 346 may be coordinated, such as by signals from interface 340 to transmit information at appropriate times. For example, as described in more detail above, results server 346 may transmit first in response to a request, and ad server 348 may transmit once result server is finished transmitting. Although termed "servers," the ad server 348 and results server 346 may be, but need not be, formal computer servers, and could take the form, for example, of separate processes running on a single computer or could be multiple separate or combined components on one or more computers.

Remote device 302 is shown as a wireless device that obtains information from, and transmits information to, a wireless network 308 connected to network 306. The connection may occur through external interface 310 which includes components adequate to create an outgoing wireless signal from data provided by the device, and to create internally-usable signals from incoming signals. The relationship of such components may be organized according to a familiar layered approach. Such components may include, for example, physical layer circuitry for receiving, de-multiplexing, and decoding signals (and vice-versa), analog-to-digital and digital-to-analog converters, and other structures needed to provide various applications on device 302 with data and to pass on data from the applications.

Remote device may be, in one exemplary embodiment, a wireless telephone that presents information to a user through display 312 (such as a small LCD or other display), and receives information from the user via keypad 314 (such as a standard telephone keypad, a constrained keypad, or a full QWERTY keypad). Other approaches for providing information to the device 302 may also be used, including voice and handwriting recognition, and various pointers. Likewise, other approaches for obtaining information from the device 302 for the user may be used, including through voice synthesis. Data from keypad 314 is received by input interpreter 318 which converts electrical signals produced by the keys of the keypad to data that can be used by various applications on the device 302. Display controller 316 likewise converts signals from applications to generate screens on display 312.

A search module 320 may be provided on device 302 to allow a user to search for information and to receive and display relevant results in response. The search module 320 may be a part of a browser application associated with the device 302, or may be part of a separate application. In general, the search module generates a blank search screen for a user, receives input from the user and formats the input for transmission to central system 304, receives responses from central server 304, and prepares the information from the responses for display.

The search module 320 may include a content coordinator 326 configured to handle content received from remote system 304. For example, content coordinator 326 may immediately display certain information such as search results, but may set aside other material, such as certain advertisements, for storage and later display. The content coordinator may store such advertisements, for example, in cache 322. It may also determine that certain advertising content is available for display, and may contain control logic as discussed above for displaying advertising and results in relation to each other.

Interpreter 328 obtains input from a user of device 302 and may cause content coordinator 326 to change what is displayed to a user. For example, interpreter 328 may maintain awareness of what is currently displayed on display 312 and receive user input related to what is displayed. Interpreter 328 may compare the input to what is displayed, and may generate appropriate control signals. For example, when a logo and a the text of an advertisement are displayed and the user selects the logo, the interpreter may determine that the general web site for the advertiser should be retrieved. If the text is selected, interpreter 328 may interpret the command as a request for content from the advertiser that is specifically related to the command, and the interpreter may generate control signals to retrieve a specific web page related to the advertisement.

The interpreter 328 may also make use of dictionary 324 to better understand commands from a user. For example, when a user enters a follow-up search term, the interpreter 328 may identify synonyms for the term using dictionary 324, and may then search for advertising keywords in cache 332 that match the term and its synonyms. Upon receiving and interpreting commands, interpreter 328 may communicate with content coordinator 326 to control what information is shown to the user of device 302.

Figure 6:
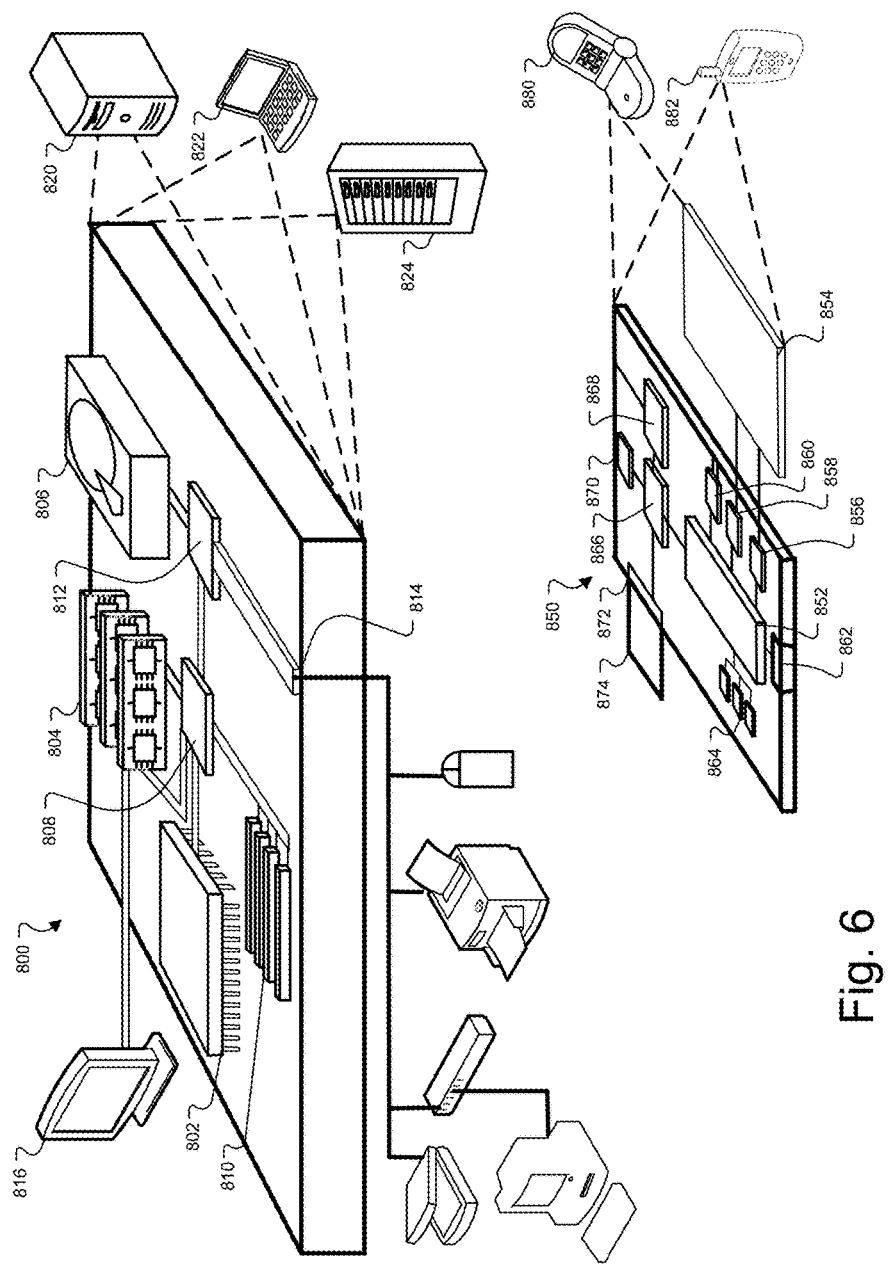
FIG. 6 is a block diagram of computing devices that may be used to implement the systems and methods described in this document, as either a client or as a server or plurality of servers.

FIG. 6 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In-Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various steps in processes described herein may be combined, split, or eliminated, and additional steps may be added. Also, components described herein may take other forms and may be combined with other components, be assisted by additional components not described here, and split into multiple sub-components. Accordingly, other embodiments are within the scope of the following claims.

What is claimed is:

1. A communication device, comprising:
  a communications interface configured to communicate with a remote server over a bandwidth-constrained wireless network having an inherent delay;
  a cache;
  a graphical display to present information to a user of the device; and
  a content coordinator configured to:
    obtain, over the bandwidth-constrained wireless network and with the delay inherent in the bandwidth-constrained wireless network, content that comprises:
      first content determined by the remote server system to be directly responsive to a first information request, and
      second content predicted by the remote server system, based on the first information request, as being directed to a specified category of a future subsequent information request, wherein at least some of the second content is of a size that requires an amount of download time that exceeds the inherent delay, wherein the content coordinator is configured to predict the specified category based on queries that were submitted by other users following submission of the first information request by the other users;

display at least some of the received second content along with the first content on the graphical display;

store at least a portion of the received second content in the cache;

receive a second information request from the user after: (i) receiving the second content from the remote server system over the bandwidth constrained wireless network and with the inherent delay, and (ii) displaying a portion of the received second content along with the first content on the graphical display, wherein:

the first information request includes a first textual search query and the second information request includes a second textual search query; and the first textual search query is not included in the second textual search query;

determine that the second information request is a request for content related to the specified category;

identify some or all of the stored second content that corresponds to the specified category, and to display on the graphical display, without the inherent delay and in response to the second information request, all or some of the identified stored second content during the retrieval of the responses to the second information request, so the identified stored second content is displayed in less time than the inherent delay.

2. The communication device of claim 1, wherein the cache stores information that identifies categories of the second content.

3. The communication device of claim 1, wherein the first information request comprises a search request, and the content coordinator is configured to retrieve additional content using the first information request or the specified category while the first content is being presented.

4. The communication device of claim 1, wherein the second information request comprises a search request, the first content is a set of search results, and the second content is one or more advertisements.

5. The communication device of claim 1, wherein the second content includes a hyperlink that permits the user to obtain additional information about the second content and an element that initiates a phone call in response to user interaction with the element.

6. The communication device of claim 1, wherein the first information request comprises a spoken query, and the first content includes a phrase that matches one or more terms in the first information request.

7. The communication device of claim 1, wherein the second content is associated with a word that matches a term in the second information request.

8. The communication device of claim 1, wherein the second content is selected in response to the first information request by a server separate from the remote device.

9. The communication device of claim 1, wherein the second content is displayed while the communication device is retrieving additional content relating to the second information request from the remote server.

10. The communication device of claim 8, wherein the content coordinator is configured to perform operations comprising replacing the presentation of the identified stored second content with all or some of the responses to the second information request.

11. The communication device of claim 1, wherein the stored second content is identified based on a level of match between each piece of second content and the specified category.

12. The communication device of claim 1, wherein the second content is ranked at the communication device and is selected at the remote server system.

13. An electronic content distribution system comprising:
one or more server computing devices;
one or more computer-readable media coupled to the one or more server computing devices and having instructions stored thereon which, when executed by the one or more server computing devices, cause the one or more server computing devices to perform operations comprising:

receiving, over a bandwidth-constrained wireless network having an inherent delay, from a part of a mobile computing device, a first information request having a subject to which the first information request is directed;

identifying one or more first content items comprising first content as being directly responsive to the first information request;

predicting a specified category of a future subsequent information request based on queries that were submitted by other users following submission of the first information request by the other users;

identifying, based on the first information request, one or more second content items predicted as being directed to the specified category of the future subsequent information request, wherein at least some of the second content items are of a size that requires an amount of download time that exceeds the inherent delay;

providing, over the bandwidth-constrained wireless network and with a delay inherent in the bandwidth-constrained wireless network, to a part of the mobile computing device, the identified first content items and the identified second content items; and receiving, at the remote server system, a second information request from the part of the mobile computing device after providing the identified second content items over the bandwidth-constrained wireless network and with the inherent delay, the request directed to information managed by the remote server system;

wherein the first information request includes a first textual search query, the second information request includes a second textual search query, and the first textual search query is not included in the second textual search query; and one or more computer-readable media coupled to the one or more mobile computing devices and having instructions stored thereon which, when executed by the one or more mobile computing devices, cause the one or more mobile computing devices to perform operations comprising:

displaying, at the mobile computing device, at least some of the provided second content items along with at least some of the provided first content items;

storing, at the mobile computing device, at least a portion of the provided second content items;

determining that the second information request is a request for content related to the specified category; and presenting, without the inherent delay and after: (i) displaying at least some of the provided second content items along with at least some of the provided first content items, (ii) receiving the second information request, and (iii) determining that the second information request is a request for content related to the specified category, one or more of the stored second content items while retrieving data responsive to the second information request from one or more of the server computing devices over the bandwidth-constrained network and with the inherent delay, wherein the stored second content items are presented before presenting content received from one or more of the server computing devices that is responsive to the second information request, so that presentation of the stored second content items occurs in less time than the inherent delay.

14. The system of claim 13, wherein the stored second content items are presented while the mobile computing device is retrieving information from the server computing device over the bandwidth-constrained wireless network.

15. The system of claim 13, wherein the stored second content items comprise a graphical item and a related non-graphical item.

16. The system of claim 15, wherein the graphical item comprises a logo and the non-graphical item comprises text.

17. The system of claim 15, wherein the graphical item is retrieved from the stored second content items and presented while the non-graphical item is being retrieved from the server computing device over the bandwidth-constrained wireless network.

* * * * *

UNITED STATES PATENT AND TRADEMARK OFFICE
CERTIFICATE OF CORRECTION

PATENT NO. : 10,387,919 B1
APPLICATION NO. : 15/096898
DATED : August 20, 2019
INVENTOR(S) : Baluja et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this
Second Day of June, 2020

Andrei Iancu
*Director of the United States Patent and Trademark Office*